UNITED STATES PATENT OFFICE.

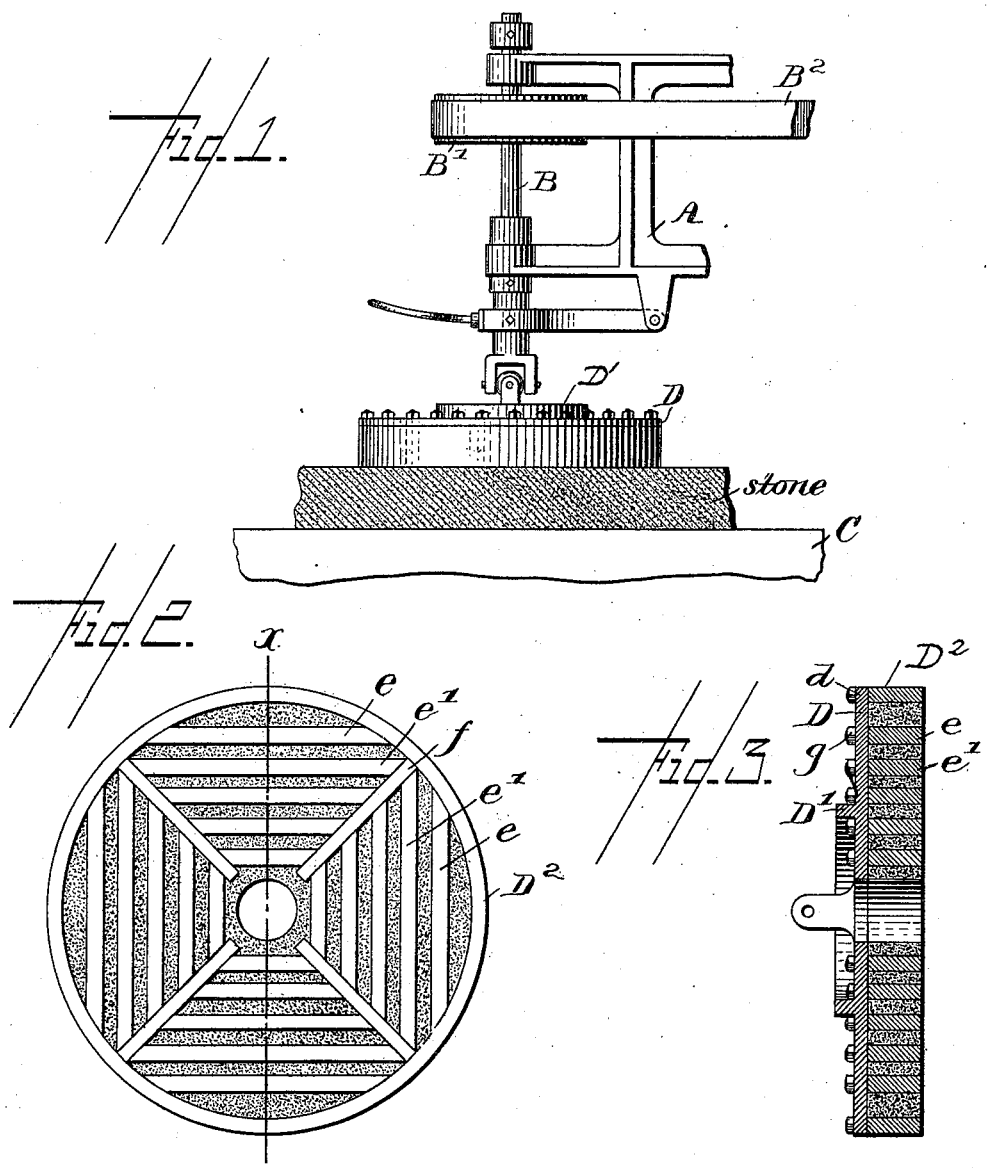

ALEXANDER M. I. McLEOD, OF QUINCY, MASSACHUSETTS.

RUBBER FOR SURFACING STONE, MARBLE, &c.

SPECIFICATION forming part of Letters Patent No. 642,355, dated January 30, 1900.

Application filed February 11, 1899. Serial No. 705,340. (No model.)

*To all whom it may concern:*

Be it known that I, ALEXANDER M. I. MCLEOD, of Quincy, county of Norfolk, State of Massachusetts, have invented an Improvement in Rubbers for Surfacing Stone, Marble, &c., of which the following description, in connection with the accompanying drawings, is a specification, like letters on the drawings representing like parts.

This invention has for its object the production of a novel rubber for smoothing or dressing stone, marble, &c.

My improved rubber consists, essentially, of a strong stiff back and a series of soft-metal blades attached to said back by suitable bolts, the ends of the blades being suitably braced from top to bottom. Preferably the space between the blades will be filled with material which will wear away faster than the blades themselves, and preferably the back will be a stiff plate of cast metal.

Figure 1, in perspective, shows a sufficient portion of an apparatus for moving a rubber with my improved rubber applied to enable my invention to be understood. Fig. 2 is an enlarged under side view of the rubber; and Fig. 3 is a section of the rubber on the dotted line $x$, Fig. 2.

The swinging head A, it having suitable bearings at one end for the spindle B, provided with a pulley B', encircled by a belt $B^2$, driven from any suitable pulley at the center of motion of the swinging head, and the bed or support C are and may be all as usual in machines for rubbing or surfacing stone, marble, &c.

The invention herein contained lies chiefly in the rubber itself. My improved rubber is composed of a back plate D, preferably made of cast metal, the back plate having at its upper side a curb D', in which may be placed the small iron balls or granules which contact with the stone or marble to be smoothed or dressed at the points where the rubber operates. These balls or granules are made from cast metal and are excessively hard. To this back plate D, I connect a metallic hoop or band $D^2$, using suitable set-screws $d$, and within said hoop or band I arrange a series of blades $e\ e'$, &c., the ends of the blades being sawed to a bevel and abutting against radial blades $f$. All these blades are suitably connected with the back D by means of set-screws $g$, extended through the back and into the threaded holes in the blades, and by bracing the ends of the blades $e\ e'$, &c., against the sides of the radial blades $f$ it is possible to support the blades throughout their entire depth firmly upon or with relation to the back plate D.

The soft-metal blades, preferably iron or soft steel, are so arranged at the face of the back plate carrying them and the beveled ends of the blades $e'$ are so abutted against the radial blades $f$ that the entire system of blades is held practically immovable with relation to the back plate in the operation of the rubber. Yet any of the blades may be detached, if desired, at any time for the renewal of a blade.

Having fully described my invention, what I claim, and desire to secure by Letters Patent, is—

1. A rubber composed of a back plate, and independent soft-metal angularly-arranged blades removably attached thereto, the said blades being braced at their ends, substantially as described.

2. A rubber composed of a metallic back plate, a series of softer metallic angularly-arranged blades detachably secured thereto by set-screws, and having their ends braced and supported against radial blades, substantially as described.

3. A rubber composed of a metallic back plate, a series of softer metallic blades secured thereto by set-screws and having their ends braced and supported against radial blades, the spaces between said blades being filled in with a substance which will wear away a little faster than the said metallic blades, substantially as described.

In testimony whereof I have signed my name to this specification in the presence of two subscribing witnesses.

ALEXANDER M. I. McLEOD.

Witnesses:
GEO. W. GREGORY,
EMMA J. BENNETT.